Oct. 1, 1940.　　　　C. B. MOORE　　　　2,216,448
FLUID ACTUATED APPARATUS
Filed May 20, 1937　　　2 Sheets-Sheet 1
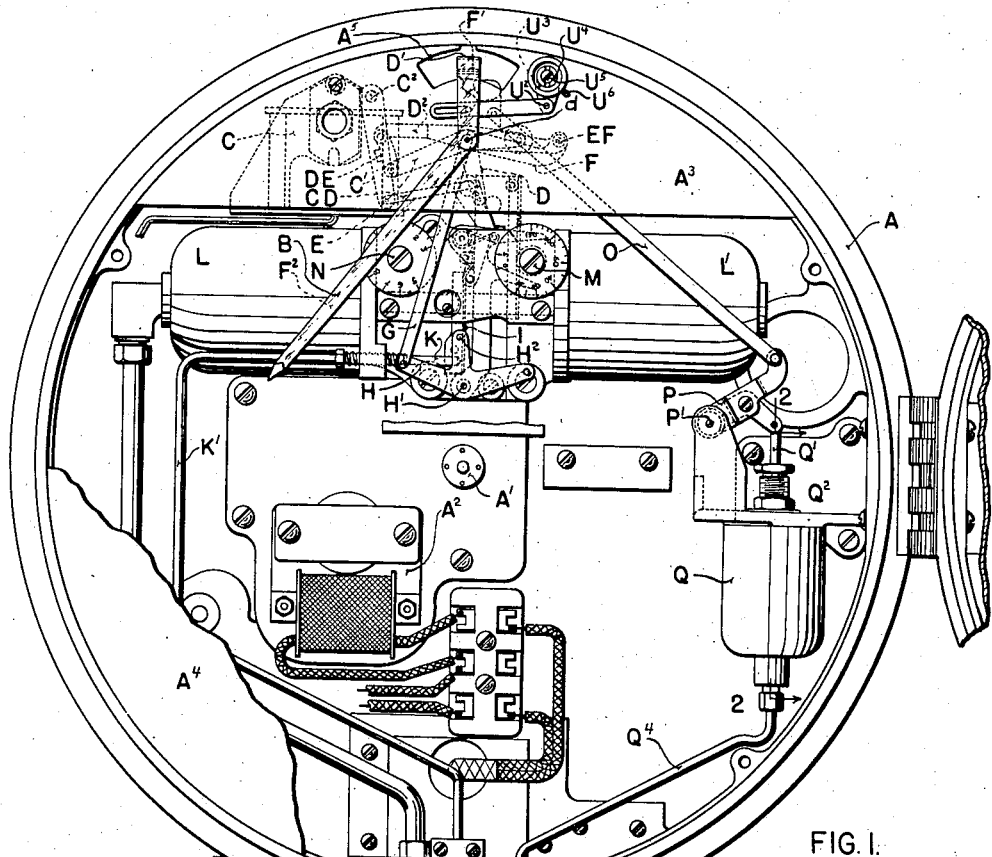
FIG. 1.
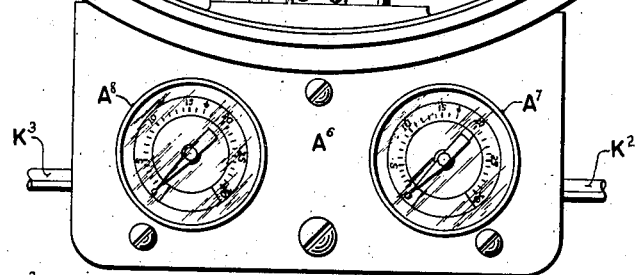
FIG. 2.
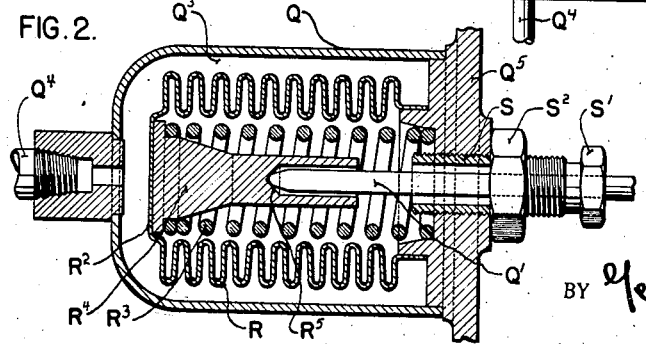
INVENTOR.
COLEMAN B. MOORE
BY George M. Unuschamf
ATTORNEY.

Oct. 1, 1940.  C. B. MOORE  2,216,448
FLUID ACTUATED APPARATUS
Filed May 20, 1937   2 Sheets-Sheet 2
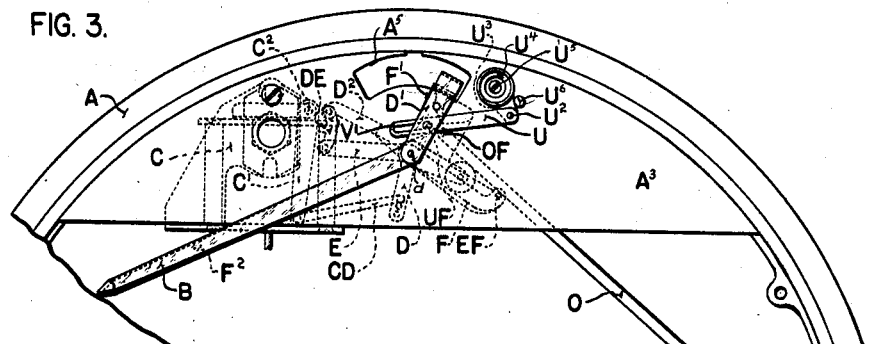
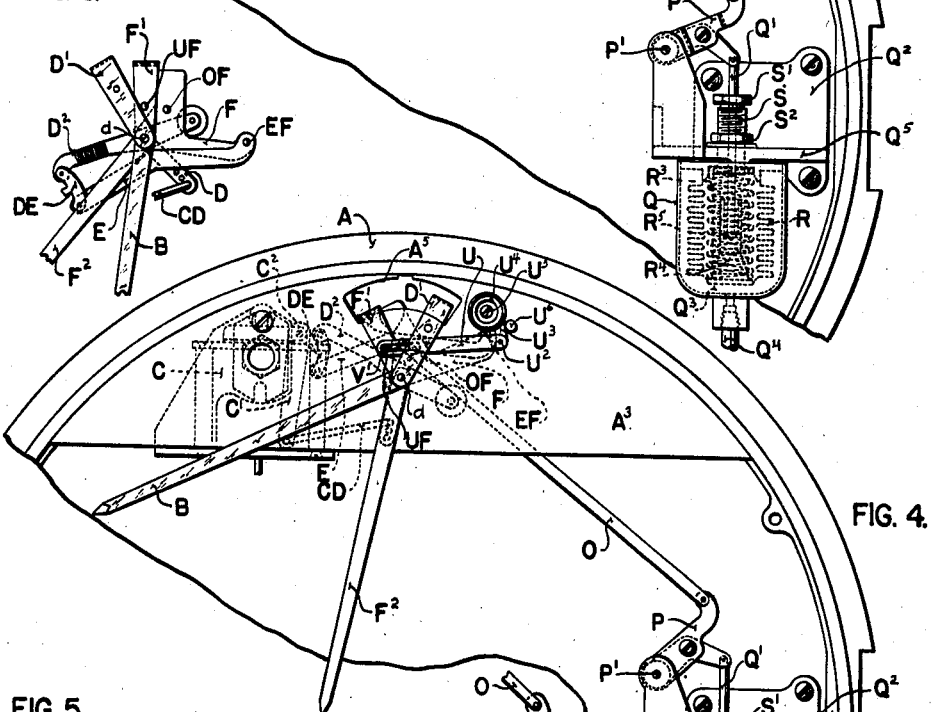
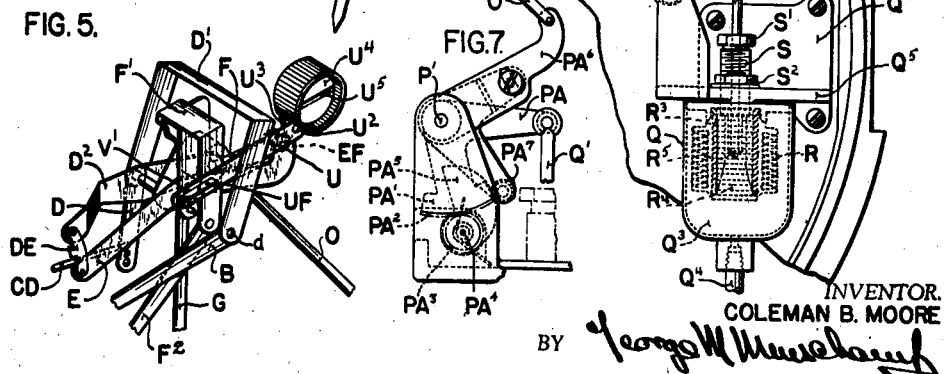
INVENTOR.
COLEMAN B. MOORE
BY
ATTORNEY.

Patented Oct. 1, 1940

2,216,448

UNITED STATES PATENT OFFICE 2,216,448

FLUID ACTUATED APPARATUS

Coleman B. Moore, Carroll Park, Pa., assignor to The Brown Instrument Company, Philadelphia, Pa., a corporation of Pennsylvania Application May 20, 1937, Serial No. 143,834

5 Claims. (Cl. 236—1)

The general object of the present invention is to provide an improved measuring and control instrument comprising means for measuring a variable quantity or condition, control means actuated by the measuring means, and novel means for modifying the action of the measuring means on the control means in accordance with the variations in a second variable condition.

My invention was primarily devised for use in what is sometimes called an interlock control instrument, for producing control effects jointly dependent on the values of two variable conditions, one of which is measured by said instrument, while the other is measured by apparatus external to said instrument. For example, the control instrument may measure a heater temperature and control the supply of fuel to the heater in joint response to the temperature measured and to the temperature of the fluid heated, the last mentioned temperature being measured by an instrument or apparatus external to the control instrument, but operatively connected thereto, to adjust its control mechanism. As those skilled in the art will understand, conditions so related as to make a control jointly dependent on them, may be pressures, temperatures, fluid rates of flow and other physical conditions, and the related conditions are not necessarily of the same kind, for example, one may be a temperature or pressure, and the other the volume of flow of a fluid.

A specific object of the present invention is to provide an interlock instrument with simple and effective provisions for adjustably fixing one or both of the limits of the range of value of the externally mentioned condition, in which the variations of the latter may modify the control action.

Another specific object of the present invention, is to incorporate simple and effective interlock, or control modifying provisions, in a so-called air controller of a commercial type which is well known and is characterized by the compactness, effectiveness and adjustability of its provisions for measuring a variable condition and for correspondingly varying a pneumatic control pressure.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a front elevation of a control instrument with parts broken away and removed;

Fig. 2 is a section on the line 2—2 of Fig. 1;

Figs. 3 and 4 are fragmentary front elevations of a portion of the instrument shown in Fig. 1, illustrating different relative positions, assumed under different operating conditions, of certain instrument parts;

Fig. 5 is a perspective view of a portion of the instrument mechanism;

Fig. 6 is an elevation, with a part broken away of one of the parts of the mechanism; and Fig. 7 is a modification of a portion of the device of Figs. 1–6.

In the drawings, I have illustrated the incorporation, in accordance with the present invention, of control modifying or interlock provisions, in a measuring and control instrument, which is now well known and in extensive commercial use, and is constructed substantially as illustrated and described in Patent No. 2,125,081, granted July 26, 1938, on my prior application, filed October 3, 1935. The instrument mechanism is enclosed in a cylindrical instrument case A, and includes a chart disk revolving element A', rotated by a timing motor $A^2$. A chart disk, not shown, is normally supported by an instrument casing wall comprising an upper part $A^3$, and a separate lower part $A^4$, only a small portion of which is shown in Fig. 1. The wall part $A^4$ is removable, to give access for installation and repairs to parts within the instrument mechanism chamber back of said wall.

A record of the quantity measured by the instrument is traced on the record chart by a pen arm B actuated by measuring mechanism C, the nature of which depends, of course, on the character of the quantity measured. For instance, the device C may be a Bourdon tube or bellows, subjected to an internal fluid pressure, which is directly measured and controlled, or may be the pressure in a fluid pressure thermometer for measuring a temperature, the latter being the quantity indirectly measured, and controlled. As shown, the mechanism C includes an arm C' mounted on a shaft $C^2$, and oscillated in accordance with increases and decreases in the quantity measured.

The oscillations of the arm C' are transmitted to the pen B by connections including a link CD connecting the arm C' to one arm of an oscillating element D, pivotally supported back of the plate $A^3$, to turn about an axis $d$. The member D includes a yoke portion D' extending through a slot $A^5$ formed in the plate $A^3$, the pen arm B being connected in a well known manner to the portion of the yoke D' in front of the plate $A^3$. The oscillating element D has another arm $D^2$ which is connected by a link DE to one end of a control lever E. At its opposite end, the lever E is pivotally connected by a pivot EF to a fulcrum member F, forming an adjustable fulcrum for the lever E. The fulcrum member F is journalled back to the plate $A^3$ to turn about the axis $d$, and thus adjust the fulcrum pivot EF for the lever E angularly about the axis $d$. The member F includes a yoke portion F' smaller in radial extent than the yoke D', and adapted to oscillate about the axis $d$, within and independently by the yoke D'. The yoke F' extends through the slot $A^5$ and carries a pointer or arm $F^2$ in front of the plate $A^3$. This pointer $F^2$ serves as a so-called control point setting index, and indicates on the record chart the value of the quantity measured, which is the normal value of that quantity, with the particular angular adjustment of the member F then existing.

The control mechanism of the instrument is actuated by the lever E through a link G. The latter is pivotally connected at its upper end to the lever E midway between the ends of the latter, and so that normally, the axis of the pivotal connection is practically coincident with the axis $d$. At its lower end, the link G is pivotally connected to one arm of a lever H pivotally supported by a pivot pin H' and having a second arm carrying a pin $H^2$. Movements of the pin $H^2$ to the left or right, as seen in Fig. 1, effect movements of a flapper valve element I. The elements I and K collectively form the pressure controlling valve of the air controller. The nozzle K forms the bleeder outlet end of a pipe K' which under normal conditions, receives air from a supply pipe $K^2$ leading from a source of air under pressure, through a restricted orifice, continuously, but at a rate sufficiently slow to make the control air pressure in the pipe K', directly dependent on the adjustment and throttling effect of the flapper I.

The pin $H^2$ is moved to the right or the left to thereby decrease or increase the pressure in the pipe K', by the clockwise or counterclockwise angular adjustments of the lever H, which are produced by clockwise or counterclockwise movements, respectively, of the actuating arm C' of the measuring means, and by the counterclockwise or clockwise adjustments respectively, of the fulcrum member F. The manner in which the last mentioned adjustments are effected, is hereinafter described.

In the commercial instrument shown in the drawings, a change in the pressure in the pipe K', resulting from an initial angular adjustment in one direction or the other of the lever H' operates through mechanism including bellows elements within the casing members L and L' shown, to bodily adjust the fulcrum pivot H' for the lever H first in one direction and then in the opposite direction to effect a so-called follow-up adjustment and a subsequent compensating adjustment. The follow-up adjustment is quickly effected and neutralizes a portion of the initially effected change in the pressure in the pipe K'. The compensating action is effected more slowly and neutralizes the effect of the preceding follow-up action. The commercial instrument illustrated in the drawings also includes adjustment devices M and N. The adjustment device M is provided to adjust the magnitude of the follow-up action and thereby vary what is commonly known as the throttling range of the control instrument, i. e., the extent of angular adjustment of the lever H about its pivot H', required to effect the full range of variation of the control pressure in the pipe K'. The adjustment device N permits of adjustment in the time required for the delayed compensating adjustment of the instrument.

The pressure maintained in the pipe K' may be directly transmitted to the fluid pressure motor valve, or other regulator controlled by the instrument, but with the commercial control instrument illustrated, the pressure in the pipe K', is directly used to control a pilot valve mechanism, located in the portion $A^6$ of the instrument housing, to pass air from the supply pipe $K^2$ into a control pressure pipe $K^3$, or to bleed pressure from the last mentioned pipe, as required to keep the pressure in that pipe in predetermined proportion to the pressure in the pipe K'. The instrument gages $A^7$ and $A^8$, shown in Fig. 1, are provided to respectively measure the normally constant air supply pressure in the pipe $K^2$, and the varying control pressure transmitted through the pipe $K^3$ from the instrument to the regulator or controller which is controlled by the instrument.

In respect to its features of construction and arrangement, specifically referred to above, the instrument illustrated includes nothing claimed as novel herein, although it does comprise inventive features claimed in my said prior application. While the present invention may be used in air control instruments differing materially in type and form from the instrument illustrated, and in particular, in struments containing neither follow-up nor compensating adjustment provisions, the fact that the interlock provisions, now to be described, may be included in the compact and efficient commercial air controller illustrated, without requiring any general modification in the instrument or any enlargement or change in the form of its cylindrical casing A, contributes to the practical merit and utility of the invention.

The interlock provisions in the embodiment of the invention illustrated, comprise novel means for automatically adjusting the fulcrum member F about the axis $d$, in accordance with variations in an externally measured condition, and comprises means through which the variations of the externally measured condition subjecting the control instrument to adjustment are confined to a range between limits, each of which may be varied as conditions make desirable.

The provisions included in the instrument illustrated for adjusting the member F about its axis $d$, comprise a link O having its upper end connected to the member F at a distance from the axis $d$ by a pivot OF and having its lower end pivotally connected through a lever P to a plunger Q'. The latter forms the actuating element of an automatic interlock element Q, which, in the form shown, is a fluid pressure responsive device. The element Q includes a supporting part $Q^2$ anchored to the back wall of the instrument casing A, and supporting the fulcrum pivot P' for the lever P. The element Q also comprises a pressure chamber $Q^3$ to which an interlock control pressure is transmitted from apparatus external to the instrument A through a pipe $Q^4$. The chamber $Q^3$ has its outer wall formed by a cup shaped shell detachably connected to a head portion $Q^5$ of the bracket $Q^2$. The inner wall of the chamber $Q^3$ is formed by a bellows element R connected at one end to the head $Q^5$, and having its opposite end $R^2$ closed and movable toward and away from the head $Q^5$, as the fluid pressure in the chamber $Q^3$ increases and diminishes.

A compression spring $R^3$ within the bellows R and acting between its closed end $R^2$ and the head portion $Q^5$, tends to elongate the bellows R against the action of the fluid pressure in the chamber $Q^3$. As shown, the spring surrounds and is coaxial with a post $R^4$ axially disposed within the bellows R and secured to its closed end $R^2$. At its free end, the post $R^4$ is formed with an axial socket $R^5$, the bottom or inner end, of which forms a seat for the rounded inner end of the plunger $Q'$.

The plunger $Q'$ passes loosely through the bore of a tubular externally threaded adjusting element S, coaxial with the bellows R, and in threaded engagement with the wall of an aperture formed for the purpose in the support portion $Q^5$. At its outer end, the part S is formed with a nut portion $S'$ for engagement by a wrench for rotating the part S and thereby varying the length of the portion of the part S at the bellows side of the part $Q^5$. $S^2$ is a lock nut for securing the member S in any desired adjustment. The post $R^4$ engages the member S and thereby restricts the contraction of the bellows to a minimum length which depends upon the axial adjustment of the part S relative to the part $Q^5$. The axial adjustment of the part S thus determines the maximum pressure within the chamber $Q^3$ at which the variations in said pressure are effective to modify the relation between the angular position of the measuring arm $C'$ and the position of the flapper I. When the pressure in the chamber $Q^3$ exceeds said maximum pressure, the engagement of the post $R^4$ with the stop S prevents the pressure from affecting the position of the plunger $Q'$. After the post $R^4$ engages the part S, the plunger $Q'$ remains stationary, until the pressure in the chamber $Q^3$ decreases sufficiently for movement of the post $R^4$ out of engagement with the stop S.

In the embodiment of the invention illustrated, the maximum value of the control pressure in the pipe $K'$, obtainable with any particular angular position of the measuring means arm $C'$ is obtained only when the member F is given the maximum counterclockwise adjustment, and thus is dependent on the adjustment of the stop S. The minimum value of the control pressure in the pipe $K'$ obtainable with the arm $C'$ in any particular position, depends upon the maximum clockwise adjustment of the member F which can occur as the pressure in the chamber $Q^3$ diminishes and the bellows R correspondingly elongates. The clockwise movement of the member F occurring as the bellows R elongates, is terminated by means independent of the pressure in the chamber $Q^3$, and manually adjustable to vary the lower limit of the range of said pressure, at which variations in the latter affect the control pressure in the pipe $K'$.

The last mentioned means comprise a link U connected to the member F by a pin and slot connection comprising a pin UF carried by the front arm of the yoke $F'$, and a slot $V'$ formed in the link U. The link U is in front of the instrument plate or wall segment $A^3$, and has its end remote from the slot $V'$, connected by a pivot $U^2$ to an arm $U^3$ carried by a shaft $U^4$ mounted in the plate $A^3$ and frictionally connected to the latter, so that it tends to remain in any angular position into which it is adjusted. The shaft $U^4$ is provided with a knurled head for finger rotation, and is also formed with a kerf $U^5$ for screw diver adjustment. As shown, the plate $A^3$ is provided with a stop $U^6$ limiting the maximum adjustment of the slot $V'$ to the right, as seen in Figs. 1, 3, and 4.

The slot $V'$ in link U should be long enough, so that in any operative condition of the apparatus, the stop S will come into action to oppose further bellows contraction and further counterclockwise adjustment of the member F, before the pin UF can come into engagement with the left hand end of the slot $V'$. A decrease in the pressure in the chamber $Q^3$ does not of itself effect a counterclockwise adjustment of the member $F'$, but the elongation of the bellows then occurring, and tending to carry the bottom wall of the socket $R^5$ away from the lower end of the plunger $Q'$, permits of clockwise movement of the member F under the slight gravitational bias for such movement which the apparatus is designed to provide. The magnitude of said bias may and should be altogether too small to turn the arm $U^3$ against the frictional resistance to its movement, when the pivot pin UF moves into engagement with the right hand end of the slot U.

The source of the interlock pressure supplied to the chamber $Q^3$ obviously may vary with the conditions of use. It is contemplated that, in many cases, it will be the control pressure determined by a second measuring and control instrument, which may be of any usual or suitable form or type of control instrument, adapted to vary a control pressure in accordance with variations in the quantity which it measures.

In the preferred practical form of the invention illustrated, the range of adjustment of the lever E effected by variations in the interlock pressure transmitted to the element Q, can result in a variation of the control pressure in pipe $K'$ which is either a small or a large fraction of the maximum total variation in said control pressure which can be jointly effected by the elements C and Q. In general, each adjustment of either of the stop devices S and U, should be attended by a corresponding adjustment of the other of those devices, and under normal operating conditions, the member F will normally occupy a position approximately midway of its range of adjustment and the pin UF will normally be at a distance from the right hand end of the slot $U'$, as seen in Fig. 1, which is approximately half of the maximum distance that the action of the stop S permits the pin UF to move away from the right hand slot end.

The portion of the range of variation in the quantity or condition to which the measuring means C is responsive, in which the action of the element Q contributes to the control effect produced, depends not only upon the adjustment of the apparatus disclosed, but on the character of the relation between the conditions for which the angular position of the arm $C'$ and the pressure in the chamber $Q^3$, respectively provide measures. In a use of the invention for the control of an oil heater, for example, in which the position of the arm $C'$ depends upon the oil heater temperature, the pressure in the chamber $Q^3$ depends upon the exit oil temperature, and the control pressure transmitted by the pipe $K^3$ acts through a fuel supply valve controller to regulate the heat supply to the heater, the apparatus might well be so designed and proportioned that under no normal operating condition would the index F² indicate a temperature differing by more than 20 or 30 degrees from an average normal furnace temperature, which might be 1200° F. or so.

In some uses of the invention, however, it may be desirable to have the angular position of the member F or analogous control element subject to adjustment by the interlock element, throughout all, or a major portion, of the range of variation of the condition determining the position of the arm C'. The type of means disclosed for adjusting the member F to changes in the actuating force impressed on the interlock element, Q, permits the calibration of the apparatus disclosed for either of the two types of uses just mentioned, as well as for uses in which still different relations exist between the conditions respectively determining the angular position of the arm C' and the pressure in the chamber Q³.

In Fig. 1, the angular adjustment of the arm C' and the longitudinal adjustment of the link O, are such that the angular positions of the pen arm B and control setting index F² are the same. In Fig. 3, the angular positions of the arms B and F² are nearly, but not quite the same, and each is displaced clockwise from its position shown in Fig. 3. In Fig. 4, the pen arm B is in the position shown in Fig. 3, but the index F² is displaced counterclockwise from the pen arm, more widely than it would be in any regular operating condition experienced in any ordinary use of the invention. In Fig. 4, the bellows R is contracted to the maximum extent permitted by the adjustment of the stop S with which the bellows post R⁴ is in engagement. In Fig. 3, the post R⁴ is out of engagement with the stop S and bellows R is expanded nearly to its maximum operative length.

In the apparatus above described, means for adjusting the control point of the instrument A have been provided in which the extent of adjustment is directly proportional to the pressure change in the chamber Q³. In the modification illustrated in Fig. 7, however, means are provided for making the extent of movement of the link O in response to change in pressure in the chamber Q³ follow a predetermined law. The device of Fig. 7 includes a lever PA corresponding to the lever P and connected to the link Q' of the unit Q. The lever PA does not directly actuate the link O, however, but effects movement of the latter through means including a gear segment PA² formed on downwardly extending arm of the lever PA which meshes with a spur gear PA³ journalled at PA⁴. An edge cam PA⁵ integral with the spur gear PA³ is adapted to engage a roller PA⁷ carried by one arm of a bell crank lever PA⁶ journalled at P', and the other arm of the lever PA⁶ is connected to the link O. On up and down movements of link Q', the cam PA⁵ is oscillated through segment PA² and gear PA³ whereby arm PA⁶ is oscillated to an extent depending upon the shape of cam PA⁵. The cam PA⁵ is configured in a manner to transmit the motion imparted to the gear PA³ to the lever PA⁶ in accordance with the desired characteristic. For example, if the external instrument controlling the pressure in the chamber Q³ is a flow meter producing a pressure which is not linearly proportional to the measured flow but varies in accordance with the square law as is customary in such meters, and if the control effected by instrument A is to be modified in direct proportion to the flow, cam PA⁵ may be so shaped that the increasing increments of movement of link Q' for equal increments of flow will effect equal increments of movement of link O. Suitable shaping of the cam PA⁵ will result in movement of the link O in linear proportion to the flow.

As those skilled in the art will understand, instruments in which use is made of the present invention have a wide field of use, and changes may be made in the form of embodiment of the invention set forth in the appended claims without departing from the spirit of said invention.

Having now described my invention, what I claim as new and desire to secure by Letters Patent, is:

1. In a pneumatic control instrument, a nozzle supplied with air under pressure, a cooperating valve member adapted to govern the pressure in said nozzle, a control motor responsive to said pressure, exhibiting means, a condition responsive means adapted to move said member with respect to said nozzle, and to actuate said exhibiting means in accordance with the varying value of said condition, a pressure operated device adapted to be controlled by an instrument external to said instrument, a connection actuated by said device and adapted together with said means to move said member with respect to said nozzle including a cam adapted to vary the proportion of movement between said device and said member.

2. In a pneumatic control instrument, a nozzle supplied with air under pressure, a cooperating valve member adapted to govern the pressure in said nozzle, a control motor responsive to said pressure, exhibiting means, a condition responsive element adapted to vary the relation of said member and nozzle, and to actuate said exhibiting means in accordance with the varying value of said condition, a device adapted to be controlled by an automatic control instrument external to said instrument, a connection actuated by said device and adapted to vary the relation between said member and nozzle including a cam adapted to vary the proportion of movement between said device and the actuating portion of said connection.

3. In a measuring and control instrument, the combination of measuring means, exhibiting means actuated by said measuring means to exhibit the value of a quantity measured by said measuring means, control means, an adjustable mechanical connection between said control means and measuring means through which the latter adjusts said control means, and a fluid pressure responsive device adapted to adjust said connection as the fluid pressure acting on said device increases and diminishes through a certain range, said connection including a lever, a second lever actuated by said device, and means interposed between said levers to vary the extent of movement of the first mentioned lever by the second mentioned lever in different portions of said range including a gear segment actuated by the second mentioned lever, a gear actuated by said segment, and a cam actuated by the said gear and adapted to actuate the first mentioned lever.

4. In a measuring and control instrument, the combination of measuring means, exhibiting means actuated by said measuring means to exhibit the value of a quantity measured by said measuring means, control means, means through which said measuring means actuates said control means including a member adapted to be angularly adjusted and to thereby modify the relation between the said measuring and control means, and means for automatically effecting angular adjustments of said member in response to variations in a fluid pressure comprising a pressure responsive device having a movable wall against which said pressure acts in one direction, and which is given movements in that direction and in the opposite directions by increases and decreases respectively in said pressure, a connection between said wall and member, and adjustable means adjustably limiting the extent to which said wall can move in said one direction, said connection between said movable wall and member being a thrust connection operative to move said member only on movement of said wall in said one direction, and in which said member is based for angular movement in a direction opposite to that in which it is moved by said connection, and which includes adjustable means limiting the movement of said member in the last mentioned direction and comprising a longitudinally adjustable link and a pin and slot connection between said link and said member.

5. In a measuring and control instrument, the combination of measuring means, exhibiting means actuated by said measuring means to exhibit the value of a quantity measured by said measuring means, control means, means through which said measuring means actuates said control means including a member adapted to be angularly adjusted and to thereby modify the relation between the said measuring and control means, and means for automatically effecting angular adjustments of said member in response to variations in a fluid pressure comprising a pressure responsive device having a movable wall against which said pressure acts in one direction, and which is given movements in that direction and in the opposite direction by increases and decreases respectively in said pressure, a connection between said wall and member, and adjustable means adjustably limiting the extent to which said wall can move in said one direction, said connection between said movable wall and member being a thrust connection operative to move said member only on movement of said wall in said one direction, and in which said member is based for angular movement in a direction opposite to that in which it is moved by said connection, and which includes adjustable means limiting the movement of said member in the last mentioned direction and comprising an angularly adjustable member and link pivotally connected to one of said members and connected to the other member by a pin and slot connection.

COLEMAN B. MOORE.